United States Patent [19]
Armstrong

[11] 3,948,684
[45] Apr. 6, 1976

[54] OXYGEN ELECTRODE AND PROCESS FOR MAKING THE SAME

[75] Inventor: William A. Armstrong, Ottawa, Canada

[73] Assignee: Her Majesty the Queen in right of Canada as represented by the Minister of National Defence, Canada

[22] Filed: Oct. 29, 1973

[21] Appl. No.: 410,423

[30] Foreign Application Priority Data
Nov. 1, 1972   Canada .............................. 155352

[52] U.S. Cl. ........................ 136/120 FC; 136/86 D
[51] Int. Cl.² ...................................... H01M 27/04
[58] Field of Search ........................... 136/138–139, 136/120 FC, 120 R, 121–122, 86 D; 252/471; 423/599, 605

[56] References Cited
UNITED STATES PATENTS

| | | | |
|---|---|---|---|
| 1,221,991 | 4/1917 | Holmes | 136/139 |
| 1,617,230 | 2/1927 | Apostoloff | 136/138 |
| 1,639,985 | 8/1927 | Brown | 136/139 |
| 3,097,974 | 7/1963 | McEvoy et al. | 136/120 FC |
| 3,212,936 | 10/1965 | McEvoy et al. | 136/120 FC |
| 3,310,434 | 3/1967 | Kordesch | 136/120 FC X |
| 3,347,668 | 10/1967 | Clark et al. | 136/120 FC X |
| 3,432,355 | 3/1969 | Niedrach et al. | 136/86 D |
| 3,451,856 | 6/1969 | Fraase et al. | 136/120 FC |
| 3,640,683 | 2/1972 | Miyazaki et al. | 136/139 |
| 3,649,361 | 3/1972 | Paynter et al. | 136/86 D |
| 3,793,083 | 2/1974 | Paynter | 136/120 FC |

*Primary Examiner*—Anthony Skapars
*Attorney, Agent, or Firm*—Millen, Raptes & White

[57] ABSTRACT

An improved gas permeable hydrophobic electrode structure and procedures for making it are provided. The electrode structure comprises an electrically conductive metal current collecting grid and catalyst substrate, for example, nickel. A manganese dioxide catalyst is deposited on, and is adhered to, both side faces of the grid. Such manganese dioxide is one which has been deposited in situ on a suitable substrate, for example, activated carbon or sintered nickel, and is bound together within the selected substrate by means of a fluorocarbon polymer, for example, polytetrafluoroethylene. A hydrophobic semipermeable membrane, for example, a fibrous polytetrafluoroethylene membrane or a microporous polypropylene membrane, is secured on one side of the coated nickel grid. The catalyst of manganese dioxide, formed in situ, for example, by specifically recited techniques on the above-noted selected substrate is bound together within the pore structure of the selected substrate by means of a fluorocarbon polymer, for example, polytetrafluoroethylene.

17 Claims, 1 Drawing Figure

U.S. Patent   April 6, 1976   3,948,684
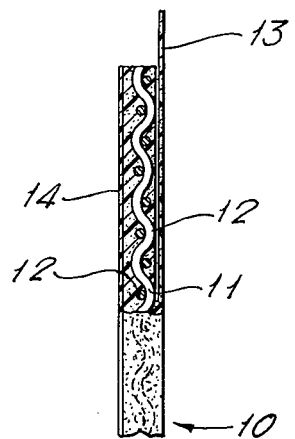

OXYGEN ELECTRODE AND PROCESS FOR MAKING THE SAME

BACKGROUND OF THE INVENTION i. General Nature of the Invention

This invention relates to an oxygen electrode (i.e. a cathode) with performance characteristics which makes it suitable for coupling with either a fuel electrode (to form a fuel cell) or a metal anode (to form a metal-air battery).

ii. Description of the Prior Art

Many metals and metal oxides may be used as catalysts in oxygen electrodes. To be effective, however, they must possess certain properties, namely, high surface area and high electrical conductivity. As most of the best catalysts, for example, platinum, palladium and silver, are also very expensive, numerous methods have been devised for depositing the catalyst on a suitable conducting substrate, such as carbon or nickel. The method used to impregnate the substrate is critical because it affects the distribution and the surface properties of the catalyst as well as the bonding of the catalyst to the substrate.

The limitations of existing oxygen electrodes are primarily of an economic nature. High costs are due not only to the use of precious metals but also to complicated production procedures.

U.S. Pat. No. 3,328,204 issued June 27, 1967 to W. T. Grubb describes a fuel cell capable of oxidizing fluid, saturated hydrocarbon fuels to carbon dioxide with the production of electrical energy at current densities up to and including the maximum power capability of the fuel cell under the cell operating conditions. The fuel cell described consisted of a pair of gas adsorbing, gas-permeable, electronically conductive electrode elements in direct contact with an aqueous phosphoric acid solution. The fuel cell was operated so that the electrolyte was at a temperature of at least about 130°C. but no greater than about 250°C. and also was in the range of from about 100°C. below the boiling point up to about the boiling point of the particular concentration of electrolyte used at the ambient pressure above the electrolyte.

The patentee taught that, although a number of different types of electrode structures were suitable for use in such cells, the cathode electrode should be one which: is electronically conductive; will adsorb the fuel or oxidant employed; will act as a catalyst of the electrode reaction; and will not itself be oxidized or corroded severely under the operating conditions of the cell. Especially suitable materials disclosed included the noble metals, for example, gold and the noble metals of the Group VIII series of metals of the Periodic Table of Elements, namely, rhodium, ruthenium, palladium, osmium, iridium and platinum. Because of their ready availability and suitability, platinum and palladium were preferred. The patentee also taught that other metals included metals of the Group VIII series of metals, namely, nickel, iron, cobalt, etc., as well as other metals known catalytically to adsorb gases, for example, silver, copper, and metals of the transition series, for example, manganese, vanadium, rhenium, etc., were operative. However, such metals under normal cell operating conditions were severely attacked by the phosphoric acid. Therefore, in order to be used for long term cell operation, they would have to be protected, for example, electrolytically plated or alloyed with a non-corrodable metal, such as platinum, palladium, etc., prior to use. In addition, it was taught that the electrodes may be formed of carbon which has been activated with the noble metals of the Group VIII series, such as platinum and palladium. The patentee further taught that for maximum cell performance the electrodes should be made by using the very active noble metal powders of the Group VIII metals, for example, platinum black, palladium black, etc.

Many ways were disclosed by the patentee for constructing the catalytically active electrodes. For example, they could be of the skeletal type obtained by forming an alloy of two metals and dissolving one of the metals leaving the other metal in a porous sheet of sufficient rigidity to use as the electrode. The metal powders may be compacted and sintered to produce the suitable electrodes having a porous nature, and if desired, can be of a multi-porous nature whereby the pores in contact with the electrolyte are smaller than the pores in contact with the fuel or oxidant gas. They could also be made by mixing metal powders with an inert binder, for example, polytetrafluoroethylene. A disclosed very desirable electrode structure could be made by incorporating metal powders in polytetrafluoroethylene which has an additional film of polytetrafluoroethylene without metal particles on the electrode side in contact with the fluid fuel or oxidant gas.

Thus the patentee provided electrodes either made using expensive catalyst materials or catalyst materials which are admitted to be severely attacked during the use of the fuel cell.

U.S. Pat. No. 3,401,062 issued Sept. 10, 1968 to E. H. Lyons, Jr. provided a photoregenerative cell incorporating a photoreducible anode, and an oxygen cathode. The patentee taught that an oxygen cathode was in intimate contact with the electrolyte. The function of the cathode was to adsorb oxygen, ionize it and transfer it to the electrolyte. Any material suitable for carrying out these functions will suffice. Lithium-doped transition metal oxides, porous or sintered platinum, silver powder, nickel oxide doped with lithium, palladium and carbon impregnated with catalysts were disclosed as being just a few of the suitable materials for the cathode. The cathode could assume various physical forms; however, it must ordinarily be porous so that the necessary adsorption and ionization can take place.

The cathode could be prepared by sinter-casting techniques. This applies equally well to silver, nickel and lithiated nickel cathodes. The doped nickel could be prepared by either of two methods. On the one hand, an intimate mixture of $Li_2O_2$ and $NiO$ could be pressed into a pellet, sealed in a vessel and heated to about 900°C. On the other hand, nickel could be reacted with a thermally decomposable salt of lithium, such as $LiOH$ or $LiNO_3$ by: (a) impregnating a sintered nickel electrode with a solution of the salt and firing to about 800°C., or (b) impregnating nickel particles, firing, pressing and sintering the lithiated particles into a porous electrode body. Reinforcement of the lithiated nickel may be advisable.

In this patent, too, the disclosure of the suitable oxygen electrode involved the use of expensive or not readily available materials.

U.S. Pat. No. 3,432,355 issued Mar. 11, 1969 to L. N. Niedrach and H. R. Alford provided gas permeable, hydrophobic fuel cell electrodes. The electrodes comprise gas adsorbing metal particles bonded together into a cohesive mass with polytetrafluoroethylene and have a coating of polytetrafluoroethylene bonded to the electrode surface in contact with the gas phase.

The patentees taught that each electrode should be one which: is electronically conductive; will adsorb the fuel or oxidant employed; will act as a catalyst for the electrode reaction; and will not itself oxidize severely under the operating conditions of the cell. Suitable gas adsorbing metals are well known.

Suitable materials disclosed included the noble metals of Group VIII series of metals of the Periodic Table of Elements, which are rhodium, ruthenium, palladium, osmium, iridium, and platinum. Other suitable metals included the other metals of Group VIII, such as nickel, iron, cobalt, etc., as well as other metals known catalytically to adsorb gases, such as silver, copper, and metals of the transition series, such as manganese, vanadium, rhenium, etc. In addition to electrodes formed of these metals the electrodes can be formed of platinum or palladium black which has been deposited on a base metal such as stainless steel, iron, nickel and the like. In addition, suitable electrodes may be formed from metal oxides and carbon which have been activated with platinum or palladium, or from carbon which has been activated with oxides of iron, magnesium, cobalt, copper, etc.

For maximum cell performance, the patentees preferred to make the electrodes by using the very active metal powders of the Group VIII metals, for example, platinum black, palladium black, Raney nickel, and so forth. The noble metals of the Group VIII series of metals have the further advantage in that when the electrolyte is an acid, corrosion conditions exist at both the anode and cathode which shorten the life of the cells having electrodes incorporating metals such as nickel, iron, copper, etc. This effect was stated not to occur in cells having electrodes made from the noble metals of the Group VIII metals. The corrosive effect is not as pronounced in fuel cells using bases as the electrolyte. Long cell life may be obtained by using any metals which are resistant to bases, for example, the Group VIII metals, including nickel, cobalt, etc., as well as other known gas adsorbing metals, such as rhenium, in cells having an aqueous base electrolyte.

Many ways were disclosed for constructing the catalytically active electrodes. One means which could be used easily to construct these electrodes was to take an aqueous emulsion of polytetrafluoroethylene resin and form a thin film on a casting surface such as a sheet of metal foil, metal plate, etc., forming the final shape of the electrode, if desired, evaporating the water and wetting agent from the emulsion, followed by sintering of the polytetrafluoroethylene, under pressure if desired, at a temperature high enough to cause the sintering of the individual particles of polytetrafluoroethylene into a coherent mass, such as from about 325° to about 450°C., preferably from about 350° to about 400°C. The time of heating would be sufficient to insure that all particles of resin reach the desired temperature, usually about 1 to about 2 minutes. Thereafter, an aqueous emulsion of polytetrafluoroethylene resin would be mixed with sufficient metal particles that the final layer prepared from this mixture would be electronically conductive, for example, from about 2 to about 20 grams of the metal powder per gram of polytetrafluoroethylene resin in the emulsion. This mixture would be spread in a thin layer on the previously formed film of polytetrafluoroethylene resin followed by evaporation of the water and wetting agents from the emulsion and sintering of the polytetrafluoroethylene in the mix, preferably under pressure, for example, about 1000 to about 3000 p.s.i. at a temperature of about 350° to about 400°C. for about 2 to about 10 minutes. Thereafter, the electrode would be removed from the casting surface and would be cut to the desired shape if not so formed by the casting operation.

The patentees further disclosed that if a current collecting grid was to be incorporated into the electrode structure, such a current collecting grid, for example, metal wires, metal strip, metal wire mesh, sintered porous sheet, punched or expanded metal plates, porous metal sheet, etc., could be incorporated into the aqueous polytetrafluoroethylene metal mix before evaporation of the water. Alternatively, a sandwich-type of electrode could be made wherein a casting surface is first coated with polytetrafluoroethylene, followed by a coating of the polytetrafluoroethylene-metal mix which is dried but need not be sintered. The polytetrafluoroethylene-metal mix also could be used to cast a thin layer on a separate casting surface without first forming the polytetrafluoroethylene film. This would be dried but need not be sintered and a sandwich would then be made with the current collecting grid between the two layers still on the casting surfaces. This sandwich would be pressed and sintered, followed by removal of the casting surfaces to give an electrode in which the current collecting grid formed an integral part of the electrode.

The patentees further taught that filler such as fibrous cloth or mat, preferably made of fibers that are resistant to highly acidic or basic conditions which they will encounter in the fuel cell, for example, glass, asbestos, acrylonitrile, vinylidene chloride, polytetrafluoroethylene, etc., may be impregnated and surface coated with a mixture of polytetrafluoroethylene and metal powder. Such a technique was taught to be desirable if the current collecting grid was not incorporated as an integral part of the electrode, but was merely pressed to the surface of the electrode on the electrolyte side where it could make contact with the metal particles. Such a technique tended to decrease the effective surface area of the electrode in contact with the electrolyte and therefore it was preferred to incorporate the current collecting grid into the electrode structure.

The patentees also taught that although other materials such as polytrifluorochloroethylene, polyethylene, polypropylene, polytrifluoroethylene, etc., could conceivably be substituted for the polytetrafluoroethylene, the chemical resistance of these materials was inferior to polytetrafluoroethylene under the conditions encountered in the fuel cells and therefore such substitution could only be made with considerable sacrifice in the desired performance and stability of the electrodes.

Suitable electrolytes for use in the cells have been disclosed in the patents referred to above. These included a solid, a liquid, a liquid adsorbed upon a perforate solid matrix, a jelled-liquid or any other suitable physical form. The chemical constituency of the electrolyte may include, for example: a mixture of alkali carbonates contained in the capillary pores of a ceramic matrix; solid solutions and solidstate reaction products of selected, mixed conductive oxides, for example, $ZrO_2$—$MgO$, $ZrO_2$—$CaO$, $HfO_2$—$CaO$, $ZrO_2$—$Y_2O_3$, $ZrO_2$—$La_2O_3$ and similar systems; an aqueous caustic electrolyte solution which has been jelled by adding to it one or more of the following: carboxymethyl cellulose in very weak alkaline solution, guar gum, synthetic resin of various types, calcium stearate or other soaps, or a hydrous oxide, for example, $Fe(OH)_3$, $Sc(OH)_3$, $Y(OH)_3$, $La(OH)_3$ or other lanthanides; or an ion exchange membrane, a water solution of perhaps 5 – 60% NaOH or KOH absorbed on a matrix composed of a major amount of MgO and minor amounts of one or more additives, such as $Al_2O_3$, $SiO_2$, other refractories, CaO and BaO.

The aqueous electrolytes are usually aqueous solutions of strong acids or strong bases, but salt systems having buffering action may be used. Strong acids and strong bases are those having a high degree of ionization. Salt systems having buffering action are well known, for example, sodium dihydrogen phosphate-potassium monohydrogen phosphate, potassium carbonate-potassium bicarbonate, phosphoric acid-sodium dihydrogen phosphate, etc. The concentration of the electrolyte should be as high as can be tolerated by the materials of construction of the cell. Likewise, the electrolyte must be soluble in the aqueous phase and should have a low enough vapor pressure that it does not volatilize into the gaseous phase. Because of these limitations, the most desirable electrolytes are sulfuric acid, phosphoric acid, the aromatic sulfonic acids such as benzene, mono-, di- and trisulfonic acids, toluene mono-, di and trisulfonic acids, the naphthalene sulfonic acids such as the $\alpha$- and $\beta$-naphthalene monosulfonic acids and the various naphthalene disulfonic acids, etc. In general, acids and bases having a dissociation constant of at least about $1 \times 10^{-4}$ are satisfactory. Typical of the bases which may be used are sodium hydroxide, potassium hydroxide, lithium hydroxide, cesium hydroxide, rubidium hydroxide, etc. In view of their ready availability, stability under fuel cell operating conditions, low cost and high degree of ionization in aqueous solution, it is preferred to use inorganic acids, for example, sulfuric acid, phosphoric acid, etc., or inorganic bases, for example, sodium hydroxide, potassium hydroxide, etc. For effective operation, a three phase boundary should be set up between the catalyst, oxygen and the electrolyte.

SUMMARY OF THE INVENTION i Aims of the Invention

Accordingly, it is an object of a broad aspect of this invention to provide an oxygen electrode which can be made inexpensively and easily from readily available materials, and which, when used in a fuel cell, has a high volume efficiency, high power capability, low polarization, high stability and high efficiency.

ii Broad Statement of the Invention

By a broad aspect of this invention, an improved gas permeable hydrophobic electrode structure is provided comprising: (a) a catalyst substrate comprising an electrically conductive metal, current collecting grid; (b) a manganese dioxide catalyst deposited on, and adhered to, both side faces of the metal grid, such manganese dioxide having been deposited in situ on a substrate selected from the group consisting of activated carbon and sintered nickel, and bound together within the selected substrate by means of a fluorocarbon polymer; and (c) a hydrophobic semi-permeable membrane on one side of such coated metal grid.

iii Variants of the Invention

By one variant of the invention, the metal grid is nickel.

By a second variant the fluorocarbon polymer is polytetrafluoroethylene.

By a third variant the semi-permeable membrane is fibrous polytetrafluoroethylene or is a microporous polypropylene.

By another broad aspect of this invention, an improvement is provided in a process for preparing a gas permeable hydrophobic electrode structure in which a catalyst is bound to both faces of a metal current collecting grid and in which a semi-permeable membrane is provided on one side of the coated grid, the improvement comprising forming the catalyst of manganese dioxide, which has been produced in situ on a substrate selected from the group consisting of activated carbon and sintered nickel, the manganese dioxide being bound together within the pore structure of the selected substrate by means of a fluorocarbon polymer.

By one variant the fluorocarbon polymer is polytetrafluoroethylene.

By another variant of this process, the semi-permeable membrane is a fibrous polytetrafluoroethylene or a microporous polypropylene membrane.

The improved process of this aspect of this invention may be carried out to produce manganese dioxide in situ on activated carbon in one procedure, as follows: The activated carbon is admixed with potassium permanganate and the potassium permanganate is then reduced to manganese dioxide in situ on the activated carbon, either by heating or by using hydrogen peroxide. Then the manganese dioxide - activated carbon is made into a paste by mixing with an aqueous suspension of a fluorocarbon polymer, such as polytetrafluoroethylene. Alternatively, the paste can be prepared by admixing the activated carbon, the potassium permanganate and the aqueous suspension of the fluorocarbon polymer, such as polytetrafluoroethylene, and then producing the manganese dioxide in situ on the activated carbon by the two alternative procedures described above.

Then the paste (formed by either of these two alternative procedures) is applied to both sides of a metal, for example, nickel, grid (which acts both as a catalyst substrate and a current collector) and the paste is dried to unite it to the grid and to bind the manganese dioxide to the pore structure of the activated carbon by means of the fluorocarbon polymer powder, such as the polytetrafluoroethylene powder. One face of the coated grid is covered with a semi-permeable membrane formed of a hydrophobic material, such as a fibrous fluorocarbon polymer. Such fluorocarbon polymer preferably is fibrous polytetrafluoroethylene or is a microporous polypropylene.

The improved process of this aspect of this invention may alternatively be carried out to produce manganese dioxide in situ on a sintered nickel in a second procedure, as follows: A nickel grid including sintered nickel thereon is impregnated with manganese nitrate. Then manganese dioxide is formed in situ in the sintered nickel by pyrolysis of the manganese nitrate. Then an aqueous suspension of a fluorocarbon polymer, such as polytetrafluoroethylene, is applied to both sides of the so-treated nickel grid and the manganese dioxide is bound to the pore structure of the sintered nickel by means of the fluorocarbon polymer, such as polytetrafluoroethylene, by heating. Alternatively, the nickel grid containing the sintered nickel may be impregnated with an aqueous suspension of manganese nitrate and with a fluorocarbon polymer, such as with polytetrafluoroethylene. The manganese dioxide is formed in situ on the sintered nickel and is bound thereto by the fluorocarbon polymer, such as the polytetrafluoroethylene, by the step of pyrolysis.

Then the so-treated nickel grid has one face thereof covered with a semi-permeable membrane formed of a hydrophobic material, such as a fluorocarbon polymer, and preferably of fibrous polytetrafluoroethylene or of a microporous polypropylene. The semi-permeable membrane may be a fibrous polytetrafluoroethylene known by the Trade Mark of Zitex E610-222 or a microporous polypropylene known by the Trade Mark of Celgard 2400.

DESCRIPTION OF THE DRAWINGS i. Brief Description of the Drawing

The accompanying drawing is an idealized vertical cross-section of an oxygen electrode structure of one embodiment of this invention.

ii. DETAILED DESCRIPTION OF THE DRAWING

In the accompanying drawing, the oxygen electrode 10 includes a nickel grid 11 which provides a catalyst support as well as acting as a current collector. Lead 13 is connected to the grid 11. On both side faces of the grid is a catalyst-carrier combination 12 bound to the grid. Catalyst-carrier combination 12 may be, for example, manganese dioxide catalyst formed in situ on an activated carbon carrier and bound to the pore by means of polytetrafluoroethylene; alternatively, it may be manganese dioxide catalyst formed in situ on sintered nickel and bound thereto by means of polytetrafluoroethylene. A semi-permeable hydrophobic membrane 14, such as of a fibrous polytetrafluoroethylene or a microporous polypropylene is secured to the side face of one of the catalyst-carrier combinations 12.

DESCRIPTION OF THE EXAMPLES i. General Description of the Examples

The following Examples are given to illustrate the preparation of oxygen electrode of aspects of this invention. In one series of Examples, specifically, Examples I–III, namely, in the manganese dioxide/activated carbon electrode, the manganese dioxide is deposited on an activated carbon substrate by the reduction of potassium permanganate (which is absorbed on the carbon). In the other series of Examples, specifically Examples IV and V, namely, in the manganese dioxide-sintered nickel electrode, the manganese dioxide is deposited on a sintered nickel substrate by the pyrolysis of manganous nitrate.

ii. Specific Description of the Examples

Example I — Manganese dioxide/activated carbon electrode 1.6 gm of activated carbon (that known by the Trade Mark of DARCO G-60) is added to a solution of 0.36 gm of potassium permanganate in 10 ml of water and the mixture stirred. To this is added 20 ml of 6% aqueous hydrogen peroxide dropwise and with stirring. The mixture is filtered and dried at a temperature less than about 125°C. A paste, made by mixing this catalyzed carbon with 5 ml of a solution prepared by the addition of 1.0 ml of polytetrafluoroethylene (that known by the Trade Mark of Teflon 30) to 10.0 ml of water, is spread on both sides of a 3 × 4 inch nickel screen (that known by the Trade Mark of Exmet 5 Ni 5 - 5/0), dried for 35 minutes at about 225°C. and then hot pressed at about 350°C. and about 23,000 lbs. Finally, one side of the electrode is covered with a polytetrafluoroethylene membrane (that known by the Trade Mark of Zitex E610-222) which is pressed on at about 120°C. and about 14,000 lbs.

Example II — Manganese dioxide/activated carbon electrode 0.7 gm of activated carbon (that known by the Trade Mark of Darco G-60) is added to a solution of 0.16 gm of potassium permanganate dissolved in 10 ml of water. This mixture is stirred, heated to boiling, filtered and dried at a temperature not greater than about 125°C. A paste, made by mixing this catalyzed carbon with 1.6 ml of a solution prepared by the addition of 1.0 ml of polytetrafluoroethylene (that known by the Trade Mark of Teflon-30) to 7.0 ml of water, is spread evenly on both sides of a 2.25 × 2.25 nickel screen, (that known by the Trade Mark of Exmet 5 Ni 5 - 5/10), dried, heated briefly to about 350°C. and hot pressed at about 350°C. and about 9500 lbs. A porous polytetrafluoroethylene membrane is pressed onto one side of the electrode.

The electrochemical properties of this oxygen electrode are somewhat better than those of the electrode produced by Example I.

Example III — Manganese dioxide/activated carbon electrode

A solution is prepared by mixing 4.1 ml water, 0.54 ml of 51% aqueous manganous nitrate and 0.5 ml of polytetrafluoroethylene (that known by the Trade Mark of Teflon-30). 20.0 ml. of this solution is added to 0.648 gm. of activated carbon (that known by the Trade Mark of Darco G-60) mixed and the resulting paste spread evenly on both sides of a 2.25 × 2.25 nickel screen, (that known by the Trade Mark of Exmet 5 Ni 5 - 5/0). This is dried, heated briefly to about 325°C. and hot pressed at about 325°C. and about 10,000 lbs. A porous polytetrafluoroethylene membrane is pressed onto one side of the electrode.

The electrochemical properties of this oxygen electrode at low temperatures (about 0°C. to about -40°C.) are superior to those of the previous electrodes.

Example IV — Manganese dioxide/sintered nickel electrode

A 1 ¼ square of sintered nickel (e.g. a nickel plaque containing a nickel screen designed for use in a nickel-cadmium battery) is soaked in an aqueous 50% manganous nitrate solution, dried over a hot plate and the process repeated. The electrode is heated at about 150°C. for 4 hours and then at about 250°C. for 16 hours. An aliquot of 0.5 ml of a solution prepared by the addition of 1.0 ml of polytetrafluoroethylene (that known by the Trade Mark of Teflon-30) to 20.0 ml of water is spread over the surface of the electrode. The electrode is then heated briefly to about 250°C. to dispel the wetting agent present in the polytetrafluoroethylene suspension. One side of the electrode is covered with a polytetrafluoroethylene membrane (that known by the Trade Mark of Zitex E610-222) which is pressed on at about 120°C. and about 2,000 lbs.

Example V — Manganese dioxide/sintered nickel electrode

A 1 ¼ square of sintered nickel (e.g. a nickel plaque of 80 - 85% porosity containing a nickel screen and designed for use in the nickel-cadmium battery) is dipped in a solution prepared by mixing equal volumes of aqueous 50% manganous nitrate solution and a solution of 1 ml polytetrafluoroethylene (that known by the Trade Mark of Teflon-30) diluted with 7 ml water. After the excess liquid has drained off the plaque is put in an oven at about 125°C. for about 1 ½ hours. The pyrolysis is then completed by placing the plaque on a hot plate at about 260°C. for about three minutes. One side of the electrode is covered with a fibrous polytetrafluoroethylene membrane (that known by the Trade Mark of Zitex E610-222) which is pressed at about 120°C. and about 2000 lbs.

Thus, in the present invention, an oxide (manganese dioxide) rather than a metal is used as the catalyst. In one embodiment, specifically the manganese dioxide/activated carbon electrode, the manganese dioxide is formed within the pore structure of the activated carbon and the resulting powder is bound together with polytetrafluoroethylene. In another embodiment, specifically the manganese dioxide/sintered nickel electrode, the manganese dioxide is formed within the pore structure of a sintered nickel plaque. All oxygen electrodes suitable for use in metal/air batteries have a semi-permeable layer on one side which permits access of oxygen to the reactive sites, but prevents the electrolyte from escaping through the electrode. In most cases this semi-permeable membrane is polytetrafluoroethylene. Accordingly, both the manganese dioxide/activated carbon electrode and the manganese dioxide/sintered nickel electrode have a layer of polytetrafluoroethylene on one side.

In the present invention, the sintered nickel is used not as a catalyst but as a substrate for the catalyst. The present invention thus provides novel ways of impregnating either activated carbon or sintered nickel plaque with manganese dioxide catalyst. The resulting electrodes are inexpensive, exhibit low polarization and have a long operational life.

Two oxygen electrodes have thus been developed, namely the manganese dioxide/activated carbon electrode and the manganese dioxide/sintered nickel electrode. Both electrodes have a nickel screen to serve as a current collector and have a semi-permeable tetrafluoroethylene membrane on one side which permits the access of oxygen to active sites within the electrode but prevents the electrolyte from passing through the electrode. Both electrodes contain manganese dioxide, which catalyzes the reduction of oxygen during operation, but the conducting substrate on which the catalyst is deposited and the procedure for deposition are different.

The present invention also provides two novel ways of depositing manganese dioxide at active sites in a conducting substrate. If the manganese dioxide/activated carbon electrode is made in such a way that the manganese dioxide is incorporated as a finely divided powder mixed thoroughly with the activated carbon, the manganese dioxide does not contribute appreciably to the catalytic activity of the electrode. This is true for a variety of grades of manganese dioxide including material prepared by the reduction of permanganate with hydrogen peroxide. Thus the procedure for producing the catalyst at the appropriate site is crucial to the success of the device.

Both electrodes have similar performance characteristics in alkaline electrolytes (comparable to the performance of silver-catalyzed electrodes) but the manganese dioxide/activated carbon electrode out-performs the manganese dioxide/sintered nickel electrode in saline electrolytes. The manganese dioxide/sintered nickel electrode is the preferred electrode for applications requiring electrical recharging (such as metal-air battery).

It is further noted that, in some embodiments of the present invention, a fluorocarbon polymer suspension is used as a means of introducing both the catalyst and the fluorocarbon polymer simultaneously. Thus, the substrate need not be impregnated with the catalyst in a prior process.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

I claim:

1. An improvement in a process for preparing a gas permeable hydrophobic electrode structure in which a manganese dioxide catalyst is bound to both faces of an electrically conductive metal current collecting grid, and in which a hydrophobic semi-permeable membrane is provided on one side of said coated grid, the improvement comprising: producing said manganese dioxide by the step of chemically decomposing an alkali metal permanganate in situ on an activated carbon substrate at a temperature below about 125°C.; and binding said manganese dioxide together within the pore structure of said activated carbon substrate by means of a fluorocarbon polymer.

2. The improvement as claimed in claim 1, wherein the alkali metal permanganate is potassium permanganate.

3. The process of claim 2 wherein said manganese dioxide is produced by admixing said potassium permanganate with said activated carbon and heating said mixture to a temperature of up to about 125°C.

4. The process of claim 2 wherein said manganese dioxide is produced by chemically reacting potassium permanganate with hydrogen peroxide at room temperature in the presence of said activated carbon.

5. The process of claim 4 wherein said manganese dioxide catalyst is produced by admixing said activated carbon, said potassium permanganate and an aqueous suspension of said fluorocarbon and heating said mixture to a temperature of up to about 125°C.

6. The process of claim 4 wherein said manganese dioxide is produced by admixing said activated carbon, said potassium permanganate and an aqueous suspension of said fluorocarbon, and reacting said mixture with hydrogen peroxide.

7. The process of claim 1 wherein said manganese dioxide is produced by admixing said alkali metal permanganate with said activated carbon and heating said mixture up to a temperature of about 125°C, and including the further steps of: first applying the admixture of activated carbon, manganese dioxide and fluorocarbon polymer to both sides of an electrically conductive metal grid, which acts as a catalyst substrate and a current collector; and then drying said admixture; thereby to unite it to said grid and to bind said manganese dioxide to the pore structure of the activated carbon by means of said fluorocarbon polymer.

8. The process of claim 5 including the further steps of: first applying the admixture of activated carbon, manganese dioxide and fluorocarbon polymer to both sides of an electrically conductive metal grid, which acts as a catalyst substrate and a current collector; and then drying said admixture; thereby to unite it to said grid and to bind said manganese dioxide to the pore structure of the activated carbon by means of said fluorocarbon polymer.

9. The process of claim 6 including the further steps of: first applying the admixture of activated carbon, manganese dioxide and fluorocarbon polymer to both sides of an electrically conductive metal grid, which acts as a catalyst substrate and a current collector; and then drying said admixture; thereby to unite it to said grid and to bind said manganese dioxide to the pore structure of the activated carbon by means of said fluorocarbon polymer.

10. The process of claim 8 including the step of covering one face of said coated grid with a semi-permeable membrane formed of a hydrophobic material.

11. The process of claim 9 including the step of covering one face of said coated grid with a semi-permeable membrane formed of a hydrophobic material.

12. The process of claim 10 wherein said hydrophobic material is a fibrous polytetrafluoroethylene.

13. The process of claim 11 wherein said hydrophobic material is a fibrous polytetrafluoroethylene.

14. The process of claim 10 wherein said hydrophobic material is a microporous polypropylene.

15. The process of claim 11 wherein said hydrophobic material is a microporous polypropylene.

16. The process of claim 2 and comprising the steps of:
   i. admixing activated carbon and potassium permanganate;
   ii. chemically reducing the potassium permanganate to manganese dioxide in situ in the activated carbon by heating to a temperature not exceeding about 125°C.;
   iii. drying such mixture and preparing a paste comprising such dried mixture and an aqueous suspension of polytetrafluoroethylene;
   iv. spreading said paste on both sides of a nickel current collecting grid screen;
   v. drying said paste and then hot pressing the assembly; and
   vi. covering one side of said assembly with a polytetrafluoroethylene semi-permeable membrane.

17. The process of claim 4 and comprising the steps of:
   i. admixing activated carbon and potassium permanganate;
   ii. chemically reducing the potassium permanganate to manganese dioxide in situ in the activated carbon by reaction with hydrogen peroxide;
   iii. drying such mixture and preparing a paste comprising such dried mixture and an aqueous suspension of polytetrafluoroethylene;
   iv. spreading said paste on both sides of a nickel current collecting grid screen;
   v. drying said paste and then hot pressing the assembly; and
   vi. covering one side of said assembly with a polytetrafluoroethylene semi-permeable membrane.

* * * * *